United States Patent

Rit et al.

Patent Number: 5,402,663
Date of Patent: Apr. 4, 1995

[54] FACILITY FOR HOT FORGING WORKPIECES STARTING FROM BARS

[75] Inventors: Jean-Paul Rit, Sierck; Denise Hoffbeck, Yutz; Paul Morgen, Vallieres, all of France

[73] Assignee: Ascometal, Puteaux, France

[21] Appl. No.: 70,361

[22] PCT Filed: Oct. 21, 1992

[86] PCT No.: PCT/FR92/00989
§ 371 Date: Oct. 12, 1993
§ 102(e) Date: Oct. 12, 1993

[87] PCT Pub. No.: WO93/07976
PCT Pub. Date: Apr. 29, 1993

[30] Foreign Application Priority Data

Oct. 22, 1991 [FR] France .................. 91 13024

[51] Int. Cl.$^6$ .................................. B21D 43/28
[52] U.S. Cl. .......................... 72/14; 72/339; 83/208; 83/73
[58] Field of Search .............. 72/14, 17, 33, 34, 31, 72/339, 294; 83/208, 371, 358, 73

[56] References Cited

U.S. PATENT DOCUMENTS

| | | |
|---|---|---|
| 3,972,211 | 8/1976 | Linthicum . |
| 4,283,974 | 8/1981 | Kline ........................ 83/208 |
| 4,343,209 | 8/1982 | Moelbert ..................... 83/208 |
| 4,727,787 | 3/1988 | Schlosser .................... 83/208 |

FOREIGN PATENT DOCUMENTS

| | | |
|---|---|---|
| 2023905 | 11/1971 | Germany ..................... 72/14 |
| 177228 | 10/1983 | Japan ........................ 83/358 |
| 1058570 | 2/1967 | United Kingdom . |
| 2059325 | 4/1981 | United Kingdom . |

*Primary Examiner*—Daniel C. Crane
*Attorney, Agent, or Firm*—Oblon, Spivak, McClelland, Maier & Neustadt

[57] ABSTRACT

A facility for hot forging workpieces starting from bars (2), which includes a device (8) for heating the bars (2), a device (3) for longitudinally moving the bars, a shearing machine (9) cutting hot billets to a length l, and a stop (11) for setting the billet length and a device for holding the cut billet. A device is also provided for detecting the ends of the bars (2) and a device (10) for rejecting the billets which have a length shorter than l. The detection device includes at least one sensor (12) of the image of the adjoining or nonadjoining ends of the bars, which device is placed a distance L from the shearing machine (9), and a computer for determining the number $n=L/l$ of billets starting from the detected end wherein the computer is connected, on the one hand, to the sensor and, on the other hand, to a device (5) for measuring the length $L_1$ of the bars.

7 Claims, 1 Drawing Sheet

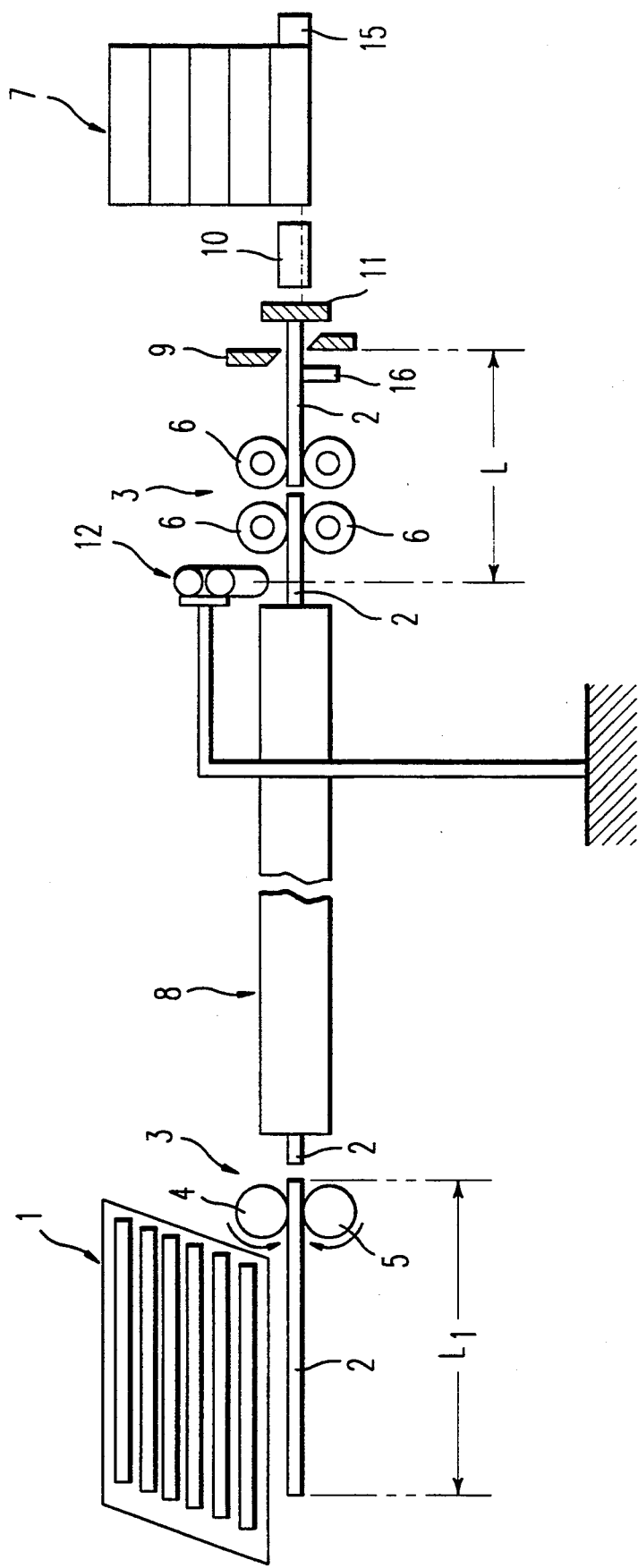

FACILITY FOR HOT FORGING WORKPIECES STARTING FROM BARS

The application is a 371 of PCT/FR92/00989, filed Oct. 21, 1992.

BACKGROUND OF THE INVENTION

1. Field of the Invention

The subject of the present invention is a facility for hot forging workpieces starting from bars.

2. Discussion of the Background

A facility is known for hot forging workpieces starting from bars which comprises a means for heating the bars, for example using an induction furnace, a means for longitudinally moving the bars in the said facility, a shearing machine for cutting, hot, to a defined length, billets intended to be forged by closed-die forging, and including a stop for setting the billet length and a means for holding the cut billet in order to direct it towards a forging die, a means for detecting ends of the bars and a means for rejecting the billets which have a length shorter than the planned length.

This facility detects the ends of the bars by identifying a space existing between the heated bars at approximately two or three bar lengths upstream of the shearing machine.

The means for identifying the ends of the bars comprises an optical camera or a charge-coupled sensor or else photoelectric sensors which indicate the space between the said bars.

This facility therefore has the main drawback of detecting only the ends of the bars.

Now, the detected clearance, existing between the bars at a distance of two or three bar lengths before the shearing machine, is generally absorbed by slip on account of the fact that the movement of the bars is a constant-speed movement, whereas the last bar at shearing moves sequentially, by being brought up against a stop before the shearing.

The distance between and the slip of the bars, pressing up against the bar being cut, lead to a significant error in determining the length and necessitates, on average, for safety reasons, at least three billets being rejected per bar, and sometimes five or seven.

The rejection of these billets therefore generates a significant loss of material, at least three empty-die forging operations per bar and a reduction in the output in terms of the number of forged workpieces per hour.

SUMMARY OF THE INVENTION

The object of the present invention is to overcome these drawbacks by proposing a facility which ensures a minimum scrap loss of material and consequently a saving of material and a gain in production.

The subject of the present invention is therefore a facility for hot forging workpieces starting from bars, comprising a means for heating the bars, a means for longitudinally moving the bars in said facility, a shearing machine cutting, hot, to a length l, billets intended to be forged by closed-die forging, and including a stop for setting the billet length and a means for holding the cut billet in order to direct it towards a forging die, a means for detecting the ends of the bars and a means for rejecting the billets which have a length shorter than l, characterized in that the detection means is composed of at least one sensor of the image of the adjoined or non-adjoined ends of the bars, which means is placed at a distance L from the shearing machine, and a computer determining the number $n=L/l$ of billets starting from the detected end and connected, on the one hand, to said sensor and, on the other hand, to a means for measuring the length $L_1$ of the bars, said computer controlling the means for rejecting the billets which have a length shorter than l or which is formed by two adjoined ends of bars.

According to other characteristics of the invention:
- the sensor of the image of the ends of the bars is composed of at least one camera,
- the sensor of the image of the ends of the bars is composed of two cameras,
- the detection means furthermore comprises a sensor for checking the forging operation,
- the means for measuring the length of the bars is composed of at least one calibrated roller in non-slipping contact with said bars,
- the computer comprises a means for storing the anomalies and incidents detected,
- the facility includes a sensor for detecting the slewing of the bars, which sensor is placed before the shearing machine and after the means for longitudinally moving the said bars.

BRIEF DESCRIPTION OF THE DRAWINGS

Other characteristics and advantages of the invention will appear on reading the description which follows, given solely by way of example and made with reference to the single attached figure which represents a diagram of a facility for hot forging workpieces starting from bars, according to the present invention.

DESCRIPTION OF THE PREFERRED EMBODIMENT

The facility represented diagrammatically in the single figure comprises, on the one hand, a system 1 for distributing the bars 2 one after the other on a longitudinal-movement means 3 formed by a rolling track composed of a series of rollers 4, 5 and 6 for entraining and for guiding these bars and, on the other hand, of a die 7 for simultaneously forging several billets cut from said bars.

Between the system 1 for distributing the bars 2 and the forging die 7, the facility comprises, in the direction of movement of the bars 2, a means for measuring the length $L_1$ of the bars 2, which means is constituted by, for example, the calibrated roller 5 which is rotationally driven and in non-slipping contact with the bars 2, then a means 8 for heating the bars 2, as for example an induction heating furnace, a shearing machine 9 for cutting up the bars 2 into billets of length l and a means 10 for rejecting the billets which have a length shorter than l or which are formed by two ends of adjoined bars.

This rejection means 10 is constituted, for example, by a pivoting finger.

Moreover, the shearing machine 9 is equipped with a retractable stop 11 up against which one end of the bars 2 presses during the shearing of the corresponding bar and a means, not represented, for holding the cut billet in order to direct it towards the forging die 7.

At approximately a length L of bars to be cut up and preferably before the two pairs of rollers 6, the facility includes a means for detecting the ends of the bars, which means is constituted by a sensor 12 of the image of the ends of the said bars, as for example at least one camera.

The camera or cameras 12 and the means 5 for measuring the length $L_1$ of the bars 2 are connected to a computer, not represented, checking the position of each bar in relation to the shearing machine 9.

The computer comprises a means for storing the anomalies and incidents detected.

Moreover, the facility includes a sensor 16 for detecting the slewing of the bars 2, which sensor is placed before the shearing machine 9 and after the means 3 for longitudinally moving the said bars.

The sensor 16 is a supplementary means for identifying when the bar 2 at the end is now only supported by two rollers 6 of the means 3 for longitudinally moving said bars 2.

The bars 2 are distributed over the rolling track 3 and the roller 5 measures the length $L_1$ of each bar.

The bars 2 are heated and pass in front of the camera or cameras 12 placed at a length L from the shearing machine 9 and which detect the adjoined or non-adjoined ends of the said bars 2.

The shearing machine 9 cuts up the bars 2 into billets of length l and, between each shearing, the stop 11 is retracted in order to remove the billet.

Depending on the information supplied by the camera or cameras 12 and by the means 5 for measuring the length of the bars 2, the computer determines the number $n=L/l$ of billets starting from the detected end.

Depending on the position of the ends of the bars in relation to the two ends of the billet of length l and after analysis by the computer, the rejection means 10 will reject either a billet or at most two billets when the end of the bars will be determined as being too close to one of the ends of the defective and identified billet, that is to say a billet having a length shorter than l or formed by two adjoined ends of bars.

Thus, only one billet, or at most two billets, is rejected, which consequently reduces the volume of material scrap.

In order to ensure consistency of the checking, placed on the forging die 7 is a sensor 15, such as for example a piezoelectric sensor, effectively ensuring that the rejection means 10 has correctly rejected the workpiece, this corresponding, on the forging die, to an empty-die forging operation. The sensor 15 is also connected to the computer.

The facility according to the invention therefore makes it possible to detect the ends of heated bars, these ends being adjoined or non-adjoined, occasionally even welded together by one pressing up against the other, and this is done accurately over the length such that only the billets of length shorter than l or composed of two ends of bars are rejected.

In addition, the empty-die forging operation is checked and correlated, this corresponding to a lack of a previously rejected billet.

It is also possible, by means of the two cameras for detecting the ends of the bars, to measure the diameter or the side or sides of the bars in order to determine the volume of each billet.

The facility according to the invention therefore ensures a minimum material scrap loss, a number of empty-die forging which is also a minimum and therefore a saving of material, a saving of time and a gain in production of workpieces.

It is claimed:

1. Facility for hot forging billets starting from bars, comprising:
    a mechanism for heating the bars,
    a mechanism for longitudinally moving the bars in said facility,
    a shearing machine for cutting, to a length l hot billets, and including a stop for setting the billet length and a mechanism for holding the cut billet in order to direct it towards a forging die,
    a mechanism having said forgoing die for forging said billets,
    a mechanism for detecting the end of the bar,
    a mechanism for measuring the length of the bars,
    a mechanism for rejecting the billets which have a length shorter than l, wherein the mechanism for detecting the ends of the bars comprises at least one sensor for sensing the image of one of adjoining and non-adjoining ends of the bars, said detection mechanism being placed at a distance L from the shearing machine, and
    a computer for determining the number $n=L/l$ of billets starting from the detected end wherein said computer is connected to said sensor and to the mechanism for measuring a length $L_1$ of the bars, said computer controlling the mechanism for rejecting the billets which have a length shorter than l, or which are formed by two adjoining ends of the bars.

2. Facility according to claim 1, characterised in that the sensor of the image of the ends of the bars comprising at least one camera.

3. Facility according to claim 1, wherein the sensor for sensing the image of the ends of the bars comprises two cameras.

4. Facility according to claim 1, wherein the detection mechanism comprises a sensor for checking forging operation of said forging die.

5. Facility according to claim 1, wherein the mechanism for measuring the length $L_1$ of the bars comprises at least one calibrated roller in non-slipping contact with said bars.

6. Facility according to claim 1 wherein the computer comprises a mechanism for storing the anomalies and incidents detected.

7. Facility according to claim 1, which comprises a second sensor for detecting slewing of the bars, wherein said second sensor is placed before the shearing machine and after the mechanism for longitudinally moving said bars.

* * * * *